March 30, 1926.

R. T. PIERCE

IRON VANE INSTRUMENT

Filed June 15, 1921

1,578,362

WITNESSES:

INVENTOR
Raymond T. Pierce
BY
ATTORNEY

Patented Mar. 30, 1926.

1,578,362

UNITED STATES PATENT OFFICE.

RAYMOND T. PIERCE, OF WILKINSBURG, PENNSYLVANIA, ASSIGNOR TO WESTING-HOUSE ELECTRIC & MANUFACTURING COMPANY, A CORPORATION OF PENNSYLVANIA.

IRON-VANE INSTRUMENT.

Application filed June 15, 1921. Serial No. 477,855.

*To all whom it may concern:*

Be it known that I, RAYMOND T. PIERCE, a citizen of the United States, and a resident of Wilkinsburg, in the county of Allegheny and State of Pennsylvania, have invented a new and useful Improvement in Iron-Vane Instruments, of which the following is a specification.

My invention relates to electrical measuring instruments and particularly to measuring instruments of the iron-vane type.

One object of my invention is to provide a device of the above indicated character that shall be provided with a scale of greater effective length than has been usual in iron-vane instruments.

Another object of my invention is to provide means for automatically varying the strength of a permanent magnet and that shall permit a selection of characteristics with which a device embodying the magnet shall operate.

Another object of my invention is to provide an electrical translating device that shall employ opposing actuating means that are reciprocally strengthened and weakened in response to circuit changes.

Heretofore, it has been usual to provide electrical measuring instruments, and particularly those of the iron-vane type, with permanent magnets for holding or biasing the movable vane or other member in a predetermined position.

An electromagnet energized in accordance with a certain characteristic of a circuit to be measured so affects the movable vane, usually in opposition to the effect of the permanent magnet, as to cause movement of the vane and its accompanying pointer or other indicating member.

The opposing pole faces of the electromagnet and the permanent magnet, between which the vane moves, are usually disposed at right angles but, however they may be related, the vane cannot move the full angular distance between them by reason of the unchangeable pull of the permanent magnet. Furthermore, the angular distance moved by the vane is usually a fixed maximum of less than the angular distance between the poles.

In practicing my invention, I provide means for so directing or changing the flux of the permanent magnet as to permit the vane to move substantially the full angular distance between the poles or to be selectively adjusted to move a predetermined distance with respect to the poles of the permanent magnet and the electromagnet, thus permitting the employment of a scale of greater length than has heretofore been usual in instruments of this type and providing an adjustment in the calibration and selection of operating characteristics not heretofore usual.

Figure 1:
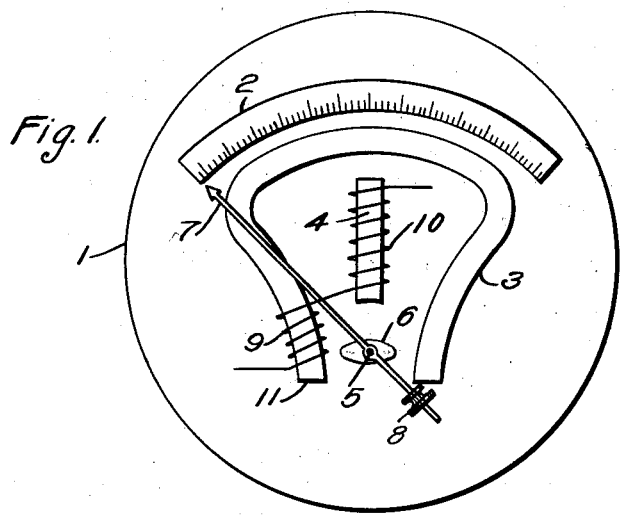
Figure 2:
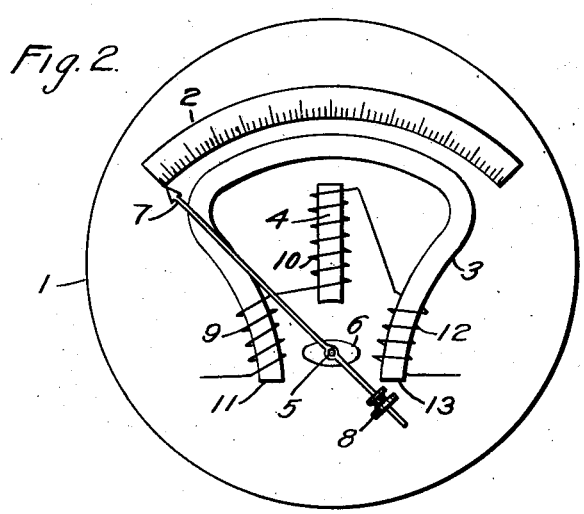

Figure 1 of the accompanying drawing is a diagrammatic view of an electrical measuring instrument embodying my invention, and Fig. 2 is a diagrammatic view of a modified form thereof.

In general, an electrical measuring instrument embodying my invention, comprises a dial plate 1, having a scale 2 thereon, a permanent magnet 3 of substantially C-shape, an electromagnet 4 and a shaft 5 on which are mounted an iron-vane 6 and a pointer 7. The latter may be so balanced by an adjustable weight or nut 8 as to permit the vane 6 to be normally biased longitudinally between the poles of the permanent magnet 3, as shown.

A coil 9, preferably connected in series relation to a coil 10 of the electromagnet 4 and to a circuit to be measured (not shown), is disposed around one leg 11 of the permanent magnet 3 adjacent to the end thereof.

In operation, when current passes through the coils 9 and 10, the former creates an electromagnetic flux, in opposition to the flux of the permanent magnet, in accordance with the strength of the current. This opposing electromagnetic flux is not of the order to demagnetize the permanent magnet but is merely to damp or choke back the flux of the permanent magnet at the normal pole portion around which the coil 9 is disposed. The effect is to shift the electromagnetic pole from the end of the permanent magnet to a position above the coil 9. This shifting occurs in accordance with the strength or change in current so that the effective pole on the permanent magnet may be gradually or suddenly moved from the end of the permanent magnet to the position above the coil 9 or back and forth along this path.

At the same time, the electromagnet 4 attracts the vane 6 in proportion to the strength of the current so that, as the current increases, the permanent magnet decreases its attraction for the vane while the strength of the electromagnet is increasing. Conversely, the electromagnet becomes weaker and the permanent magnet stronger during a decrease of current, so that a reciprocal strengthening and weakening of the magnets 3 and 4 takes place.

At the time that the electromagnet is strongest, the permanent magnet is weakest so that, practically the vane may move the full angular distance, or ninety degrees, between its horizontal position shown and its vertical position of attraction to the electromagnet.

In instruments, as heretofore constructed and to the best of my knowledge, full angular movement has not been possible because of the relatively strong opposition of the permanent magnets, the strength of which remained constant.

In Fig. 2, in which similar parts are designated by similar reference characters, the construction is similar with the exception of an additional coil 12 disposed around the other leg 13 of the permanent magnet and connected in series relation to the coils 9 and 10. With this arrangement the vane 6 is affected at both ends or poles to give a greater reciprocal strengthening and weakening action between the magnets 3 and 4.

By my invention, a greater scale range, as well as desirable latitude in the selection of characteristics under which the instrument shall operate, are obtained in a simple and effective manner. Thus, by changing the number of turns in the coils 9 and 12, or the position of the latter on the permanent magnet, the flux of the latter may be directed in any of a variety of ways.

While I have shown and described particular forms of my invention, changes may be effected therein without departing from the spirit and scope thereof as set forth in the appended claims.

I claim as my invention:

1. An electrical measuring instrument comprising a permanent magnet, a movable magnetizable member biased to a predetermined position thereby, an electromagnet providing a flux at a predetermined angle to the flux of the permanent magnet and means for decreasing and increasing the effect of the permanent magnet on the magnetizable member when the electromagnetic flux increases and decreases, respectively, to permit a movement of the movable magnetizable member substantially equal to said angle.

2. An electrical measuring instrument comprising a permanent magnet, a movable magnetizable member biased to a predetermined position thereby, an electromagnet for opposing the permanent magnet to move the movable member in proportion to a quantity in a circuit to be measured and means for decreasing and increasing the effect of the permanent magnet on the movable member upon increase and decrease, respectively, of energization of the electromagnet.

3. An electrical measuring instrument comprising a movable magnetizable member, a permanent magnet for biasing the same to a predetermined position and means responsive to changes in a quantity of a circuit for definitely varying the flux of the magnet and for independently affecting the magnetizable member in response to changes in said quantity.

4. An electrical measuring instrument comprising a permanent magnet, a movable magnetizable member disposed adjacent to the poles thereof and biased to a predetermined position thereby, a coil disposed in predetermined inductive relation to the permanent magnet and an actuating coil for the movable magnetizable member.

5. An electrical measuring instrument comprising a permanent magnet, a movable magnetizable member disposed adjacent to the poles thereof and biased to a predetermined position thereby, a coil disposed in predetermined inductive relation to the permanent magnet and an actuating coil for the movable magnetizable member connected in circuit with said first coil.

6. An electrical measuring instrument comprising a permanent magnet, a movable magnetizable member disposed adjacent to the poles thereof and biased to a predetermined position thereby, a coil disposed in predetermined inductive relation to the permanent magnet and an actuating coil for the movable magnetizable member connected in series-circuit relation to said first coil.

7. An electrical measuring instrument comprising a permanent magnet, a movable magnetizable member disposed adjacent to the poles thereof and biased to a predetermined position thereby, a coil disposed in predetermined inductive relation to the permanent magnet and an electromagnet for actuating said movable magnetizable member.

8. An electrical measuring instrument comprising a permanent magnet of substantially C-shape, a magnetizable vane pivoted adjacent to the poles thereof and biased to a predetermined position thereby, a stationary core member and two series-related coils disposed one on the permanent magnet and one on said core member.

In testimony whereof, I have hereunto subscribed my name this 10th day of June 1921.

RAYMOND T. PIERCE.